US009751164B2

United States Patent
Ishii et al.

(10) Patent No.: US 9,751,164 B2
(45) Date of Patent: Sep. 5, 2017

(54) METHOD OF MANUFACTURING A HOLLOW POPPET VALVE

(71) Applicant: NITTAN VALVE CO., LTD., Hadano-shi, Kanagawa (JP)

(72) Inventors: Kazuhiro Ishii, Hadano (JP); Shigeru Uchida, Hadano (JP); Masahiro Meguro, Hadano (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 15/035,955

(22) PCT Filed: Nov. 21, 2013

(86) PCT No.: PCT/JP2013/081352
§ 371 (c)(1),
(2) Date: May 11, 2016

(87) PCT Pub. No.: WO2015/075795
PCT Pub. Date: May 28, 2015

(65) Prior Publication Data
US 2016/0256965 A1    Sep. 8, 2016

(51) Int. Cl.
*B23P 15/00* (2006.01)
*F01L 3/14* (2006.01)
(Continued)

(52) U.S. Cl.
CPC .............. *B23P 15/002* (2013.01); *B21K 1/22* (2013.01); *F01L 3/14* (2013.01); *F01L 3/08* (2013.01); *Y10T 29/49298* (2015.01)

(58) Field of Classification Search
CPC .......... B23P 15/002; F16K 49/00; F16K 1/36; F01L 3/14; F01L 3/24; Y10T 29/49311; Y10T 29/49307; Y10T 29/49298
See application file for complete search history.

(56) References Cited

U.S. PATENT DOCUMENTS

2012/0246936 A1\* 10/2012 Morii .................... B23P 15/002
29/890.132

FOREIGN PATENT DOCUMENTS

JP       3-18605 A      1/1991
JP       4-232318 A     8/1992
(Continued)

OTHER PUBLICATIONS

English Machine Translation of JPWO2013145250A1, published Aug. 3, 2015 (equivalent to WO2013145250A1, published on Oct. 3, 2013).*

(Continued)

*Primary Examiner* — Sarang Afzali
(74) *Attorney, Agent, or Firm* — Westerman, Hattori, Daniels & Adrian, LLP

(57) ABSTRACT

A hollow poppet valve has an internal cavity which extends from within its valve head into a valve stem portion and is partly filled with a coolant. A manufacturing method includes forming a coolant rod by cutting clayish coolant to a coolant rod of a predetermined length from the coolant material extruded from an extruder; a coolant-rod insertion step in which a coolant rod is inserted into a cavity formed in an intermediate valve product through its opening; and a step of sealing the opening of the hole. In the coolant-rod insertion step, coolant-rods are inserted into the cavity separately in multiple times. Since each coolant rod is short, it is little deformed or bent, so that it has little interference with the inner periphery of the cavity, which permits use of a thick rod and increase the amount of the coolant in the cavity.

6 Claims, 9 Drawing Sheets

(51) Int. Cl.
*B21K 1/22* (2006.01)
*F01L 3/08* (2006.01)

(56) References Cited

FOREIGN PATENT DOCUMENTS

| JP | 04232318 A * | 8/1992 | ............... F01L 3/14 |
| JP | 2012136979 A * | 7/2012 | ............... F01L 3/14 |
| WO | 2011/104912 A1 | 9/2011 | |
| WO | 2011/104923 A1 | 9/2011 | |
| WO | 2012/086315 A1 | 6/2012 | |
| WO | 2013/145250 A1 | 10/2013 | |

OTHER PUBLICATIONS

English Machine Translation of JP2012136979A, published Jul. 19, 2012.*
International Search Report dated Jan. 21, 2014, issued in counterpart International Application No. PCT/JP2013/081352 (2 pages).

* cited by examiner (a)

(b)

(a)

(b)

METHOD OF MANUFACTURING A HOLLOW POPPET VALVE

TECHNICAL FIELD OF THE INVENTION

This invention relates to a method of manufacturing a hollow poppet valve having an internal cavity that extends from within a valve head into a stem portion of the valve and is filled with a coolant.

BACKGROUND ART

There has been known a hollow poppet valve having a valve head and a stem portion integral therewith and formed with an internal cavity that extends from within the valve head into the stem portion, the cavity being charged, together with an inner gas, with a coolant that has a higher heat conductivity than the valve material. An example of such coolant is metallic sodium which has a melting point of about 98° C.

Since this valve has an internal cavity extending from within the valve head into the stem portion, and hence larger than a conventional internal cavity formed only in a stem portion, the valve can contain a larger volume of coolant in the internal cavity than the conventional valve and provide an enhanced heat transferability (hereinafter referred to as heat reduction capability). Moreover, when the valve has a diametrically larger internal cavity in the valve head than a diametrically small internal cavity in the stem portion, it can be charged with a still larger volume of coolant in the valve to increase its heat reduction capability.

It is known that if a combustion chamber of an engine is heated to an excessively high temperature during an operation, knocking may take place, which lowers the fuel efficiency, and hence the performance, of the engine. In order to lower the temperature of the combustion chamber, there has been proposed different types of hollow poppet valves each having an internal cavity filled with a coolant together with an inert gas so as to positively remove heat from the combustion chamber by enhanced heat reduction capability of the poppet valve.

Patents Documents 1 and 2 listed below disclose methods of manufacturing hollow poppet valves in which metallic sodium is injected from a nozzle into an internal cavity of the valve placed below the nozzle. Particularly, Patent Document 2 discloses a step of injecting pressurized clayish metallic sodium extruded from a nozzle of an extruder into a cavity of a valve below the nozzle while cooling the metallic sodium.

PRIOR ART DOCUMENTS

Patent Documents

Patent Document 1: JPA Laid Open H3-18605
Patent Document 2: JPA Laid Open H4-232318

SUMMARY OF THE INVENTION

Objects to be Achieved by the Invention

Although the method of Patent Document 1 enables injection of a large amount of coolant into an internal cavity of a valve, it is necessary to maintain the metallic sodium in molten state in a container. Further, in order to prevent the injected metallic sodium from being cooled, solidified, and stacked during injection as the coolant comes into contact with the valve, it is necessary to control the temperature of the facility in use, which increases manufacturing cost of the valve.

In the method of Patent Document 2, a clayish solidified elongate metallic sodium is extruded from a nozzle and injected into an internal cavity of a valve, but smooth injection of such elongate coolant may be impeded by an interfering inner periphery of the internal cavity before the coolant reaches a deep level in the internal cavity. In other words, since the clayish metallic sodium extruded from the nozzle has a length that corresponds to the depth of the internal cavity (which is much larger than its thickness), it is often bent before it is smoothly injected deeply into the cavity.

It is noted that smooth injection of such metallic sodium can be achieved if the outer diameter of the elongate clayish is reduced much less than the inner diameter of the cavity. However, then, a problem arises in that a space between the injected metallic sodium and the inner periphery of the internal cavity increases, thereby reducing the amount of the metallic sodium injected in the internal cavity and hence reducing the heat reduction effect by the sodium.

The inventors have come across a desirable solution to increase the amount of metallic sodium extruded from an extruder and inserted into an internal cavity as much as possible by first reducing the interference between the outer periphery of the elongate coolant and the inner periphery of the internal cavity by approximating the outer diameter of the elongate coolant to the inner diameter of the cavity so as to permit smooth insertion of the elongate coolant. To do this, the elongate metallic sodium to be inserted is shortened to prevent its bending (or enhancing its linearity).

Second, it is preferred to insert metallic sodium tightly in the internal cavity. One way to do so is to eliminate gaps between the inserted metallic sodium and the inner periphery of the internal cavity by pressurizing them with a pushing rod.

Since the present inventors have experimentally verified this method effective, they file an application for patent on this method.

In view of the prior art problems, it is an object of the present invention to provide, on the bases of inventors findings stated above, a method of manufacturing a hollow poppet valve comprising a step of inserting a large volume of coolant in its internal cavity.

Means of Solving the Problems

To achieve the object above, there is provided in accordance with the invention a method of manufacturing a hollow poppet valve having an internal cavity that extends from within a valve head into a stem portion of the hollow poppet valve and is filled with a coolant, the method comprising:
  a coolant-rod forming step for extruding from a nozzle of an extruder a linear clayish coolant and cutting the linear coolant into coolant rods of a predetermined length;
  a coolant-rod inserting step for inserting the coolant rod into a hole of an intermediate valve product that corresponds to the internal cavity of the hollow poppet valve, through an open end of the hole; and
  a sealing step of sealing the open end of the hole,
  the method characterized in that the coolant rod is divided into multiple pieces for insertion into the hole in multiple times in the coolant-rod injection step.
  (Function) In the coolant-rod insertion step, if a coolant rod is divided into two parts for example, and inserted into the hole in two steps, the length of each coolant rod to be injected into the hole is about one half the length of a coolant rod to be inserted in one step.

If the length of each coolant rod is short, the rod is less likely to be bent and interfere with the inner periphery of the hole of the intermediate valve product during insertion. Consequently, by approximating the outer diameter of the coolant rod to the inner diameter of the hole (or the internal cavity), gaps between the inserted coolant rod and the inner periphery of the hole can be reduced and accordingly the volume of the coolant in the hole can be increased.

The method may comprise a further step of pressurizing the coolant rod inserted in the hole of the intermediate valve product with a pushing rod.

(Function) Although small gaps are formed between the inserted coolant rod and the inner periphery of the cavity, the gaps will be eliminated as the coolant rod is pressurized by a pushing rod, so that an amount of coolant, equivalent in volume with the gaps, is increased.

In the coolant-rod insertion step, if a coolant rod inserted in the hole is stuck in the middle of the hole before it is deeply inserted in the hole, stuck coolant can be further inserted firmly into the hole as it is pressurized by the pushing rod.

The coolant-rod insertion step can be adapted to determine existence of the coolant-rod in the hole and propriety in length thereof on the basis of a length of the pushing bar inserted into the hole.

(Function) The pushing rod used to pressurize the inserted coolant-rod in the hole of the intermediate valve product functions to deform them plastically in abutment against the inner periphery of the hole, so that the length of the pushing rod inserted into the hole can indicate if the coolant rod is correctly inserted in the hole, thereby detecting if the coolant rod has a correct length.

The length of the pushing rod inserted into the hole should be constant if coolant rod has a proper length when inserted in the cavity of an intermediate valve product. On the other hand, in a case where no coolant rod is inserted in the hole for some reason or their length is either too short or too long, the downward travel distance of the pushing rod is not in a predetermined range.

In an aspect of the method of manufacturing a hollow poppet valve, the coolant-rod forming step is adapted to cause the coolant rod extruded from the nozzle to be directly inserted into a circular cylindrical jig disposed in opposition to a lower open end of the nozzle;

stop extrusion of the linear coolant from the nozzle when a predetermined amount of coolant rod is extruded from the nozzle; and cut the linear coolant to a coolant rod of a predetermined length with a cuter provided in the neighborhood of the nozzle, and store the cut coolant rod in the jig.

(Function) By controlling the amount of the coolant extruded from the nozzle of the extruder in this way, the coolant rod cut by the cutter will have a correct length as it is designed before it is placed in the cylindrical jig.

It is noted that since the linear coolant extruded from the nozzle is cut perpendicularly by the cutter as it is while its leading end is inserted in the cylindrical jig, a resultant coolant rod keeps its planar cut end perpendicularly to the linear direction of the coolant without being deformed by the cutter.

Since the cut coolant-rod is instantly placed in the cylindrical jig immediately after it is cut by the cutter, it may be transferred to a station for the coolant-rod insertion step without being deformed, in spite of the fact that otherwise the metallic sodium rod can be easily deformed, that is, if it is brought into contact with anything other than a coolant rod.

Thus, the coolant-rod transferred to a station for the coolant-rod insertion step still maintains its straight configuration and its cut end undeformed, so that it can be smoothly inserted into the hole of an intermediate valve product, without interfering with the inner periphery of the hole (or cavity).

In another aspect of the coolant-rod forming step of the method, the coolant rod is stored in the jig while it is transferred to a station for the coolant-rod insertion step, where the rod is arranged above, and in opposition to, an upper end of the hole of the intermediate valve product and ejected from the jig for insertion into the hole by a gas pressure.

(Function) Since the coolant rod in the jig is smoothly and instantly inserted into the hole of an intermediate valve product by the gas pressure, the coolant rod will be little exposed to an ambient air. It means that the coolant rod in the jig can be inserted into the hole in an extremely short period of time in the coolant-rod insertion step, which is a great advantage for the metallic sodium coolant that can be otherwise easily oxidized by the ambient air. It is preferred to use an inert gas as the pressurizing gas for pushing the coolant-rod into the hole.

Use of an inert gas in the manner as stated above is a positive way of suppressing oxidization of the coolant during a period between its extrusion from the nozzle of the extruder and insertion into the hole, and may prevent the surface of the coolant rod from becoming sticky and permit its smooth insertion into the hole.

The method may be configured such that:

the coolant-rod insertion step includes a process of inserting a coolant-rod from a bottom opening of a diametrically large internal cavity formed in the valve head shell in communication with a diametrically small internal cavity formed in the stem portion of the intermediate valve product, and the sealing step includes a process of welding a cap to the opening of the diametrically large internal cavity.

(Function) Since the intermediate valve product has an opening in the bottom of the diametrically large internal cavity in the valve head in communication with the diametrically small internal cavity in the stem cavity, a hollow poppet valve charged with a coolant can be manufactured by inserting a coolant rod into the internal cavity from the opening and then welding a cap to the opening to close the internal cavity.

In another aspect the method, the coolant-rod insertion step may be adapted to insert a coolant rod from an open end of the diametrically small stem cavity in communication with the diametrically large internal cavity in the valve head shell; and the sealing step may be adapted to weld a stem end member to that end of the stem portion of the intermediate valve product.

The diametrically small internal cavity of the intermediate valve product is communicated with the diametrically large internal cavity of the valve head shell and has an opening at an end remote from the in valve head shell, so that a hollow poppet valve charged with coolant in the internal cavity can be manufactured by welding the stem member to the opening of the stem cavity to seal the internal cavity after coolant rod is inserted from the open end.

Effects of the Invention

The present invention provides a hollow poppet valve having an excellent heat reduction effect by virtue of a large volume of coolant inserted into an internal cavity of an intermediate valve product in the coolant-rod insertion step.

The inventive method may provide a hollow poppet valve having a still more excellent heat reduction effect, since the method enables insertion of a very large volume of coolant in the internal cavity of the valve by inserting such coolant into the hole of an intermediate valve product.

According to another aspect of the method, the amount of coolant charged in the hole of the intermediate valve is directly controlled by a pushing rod, so that a resultant hollow poppet valve contains a well managed constant volume of coolant and has a constant quality.

In another aspect of the inventive method, since a coolant rod formed in the coolant-rod forming step is stowed in a jig without deforming the cut face and straight configuration of the rod until it is transferred to a station for the coolant-rod insertion step where the coolant rod needs to be inserted straight into a hole of an intermediate valve, the coolant-rod is allowed to be smoothly inserted in the hole in the coolant-rod insertion step, thereby rendering the coolant-rod insertion step smooth.

The inventive method may provide provision of a hollow poppet valve having an excellent heat reduction effect in spite of the fact that the internal cavity is filled with a large volume of easily oxidizable coolant. This can be done by positively suppressing possible oxidation of the coolant over a period between its extrusion from an extruder and its insertion into an internal cavity of the intermediate valve product.

According to another aspect of the inventive method, a hollow poppet valve having an internal cavity filled with a large volume of coolant can be obtained from an intermediate valve product having an opening in the bottom of the internal cavity of the valve head shell by inserting a large volume of coolant into the internal cavity from the opening.

According to another aspect of the inventive method, a hollow poppet valve filled with a large volume of coolant in its internal cavity is obtained from an intermediate valve product having at one end of the stem portion a hole that corresponds to the internal cavity of the hollow poppet valve.

BRIEF DESCRIPTION OF THE DRAWINGS

FIG. 2(a) shows a movement of the coolant when a closed valve is opened, and FIG. 2(b) when the open valve is closes.

FIG. 3(a) shows a drilling step in which a diametrically small cavity is bored in a bottom of a recess of a valve head shell, subsequent to a step of forming the valve head shell of an intermediate valve product; FIG. 3(b), a first coolant-rod forming and storing step, in which a coolant rod is cut off a coolant material extruded from a first extruder and is stored in a jig; FIG. 3(c), a first coolant-rod insertion step for inserting the coolant rod into the diametrically small internal cavity of the valve head shell, through the recess of the valve head shell; FIG. 3(d), a first coolant-rod pressuring step, in which the coolant rod in the diametrically small cavity is pressurized by a pushing rod; FIG. 3(e), a second coolant-rod forming and storing step in which a second coolant rod is cut off the coolant material extruded from a second extruder, and is stored in a second jig; FIG. 3(f), a second coolant rod insertion step in which a second coolant rod is inserted into a recess of the valve head shell of the intermediate valve product through an opening of the recess; FIG. 3(g), a second coolant-rod pressurizing step in which the coolant rod in the recess (diametrically large cavity) is pressurized by a pushing rod; and FIG. 3(h), a sealing step in which a cap is welded to the opening of the recess (diametrically large cavity) of a valve head shell to seal the opening.

FIG. 4(a) is a longitudinal cross section of a first jig for storing a first coolant rod; and FIG. 4(b) a longitudinal cross section of a second jig for storing a second coolant rod.

FIG. 8(a) shows a drilling step, subsequent to a step of forming a valve head shell at one end of a stem portion of the intermediate valve product, wherein the intermediate valve product is bored to form a hole (that corresponds to an internal cavity of a hollow poppet valve) extending from said one end of the stem portion into the valve head shell. FIG. 8(b), a first-coolant-rod forming and storing step in which a first coolant rod is cut off a coolant material extruded from the first extruder and is stored in a jig; FIG. 8(c), a first-coolant-rod insertion step in which a first coolant rod is inserted into the internal cavity of the intermediate valve product through an opening of the hole of the stem portion; FIG. 8(d), a first-coolant-rod pressurizing step in which a first coolant rod in the internal cavity is pressurized with an pushing rod; FIG. 8(e), a second-coolant-rod forming and storing step in which a second coolant rod is cut off the coolant material extruded from a second extruder and stored in a jig; FIG. 8(f), a second-coolant-rod insertion step in which a second coolant rod is inserted into an internal cavity of the intermediate valve product through an opening of the hole of the stem portion of the intermediate valve product; FIG. 8(g), a second-coolant-rod pressurizing step in which the second coolant rod in an internal cavity is pressurized with a pushing rod; and FIG. 8(h), a sealing step in which a stem member is welded to an open end of the stem portion of the intermediate valve product.

FIG. 10(a) shows a cross section of an intermediate valve product charged with a first coolant rod in its internal cavity in the first coolant-rod insertion step; and FIG. 10(b), a cross section of the intermediate valve product with the inserted first coolant rod in the internal cavity is pressurized with a pushing rod.

BEST MODE FOR CARRYING OUT THE INVENTION

The invention will now be described in detail with reference to a few embodiments.

Figure 1:
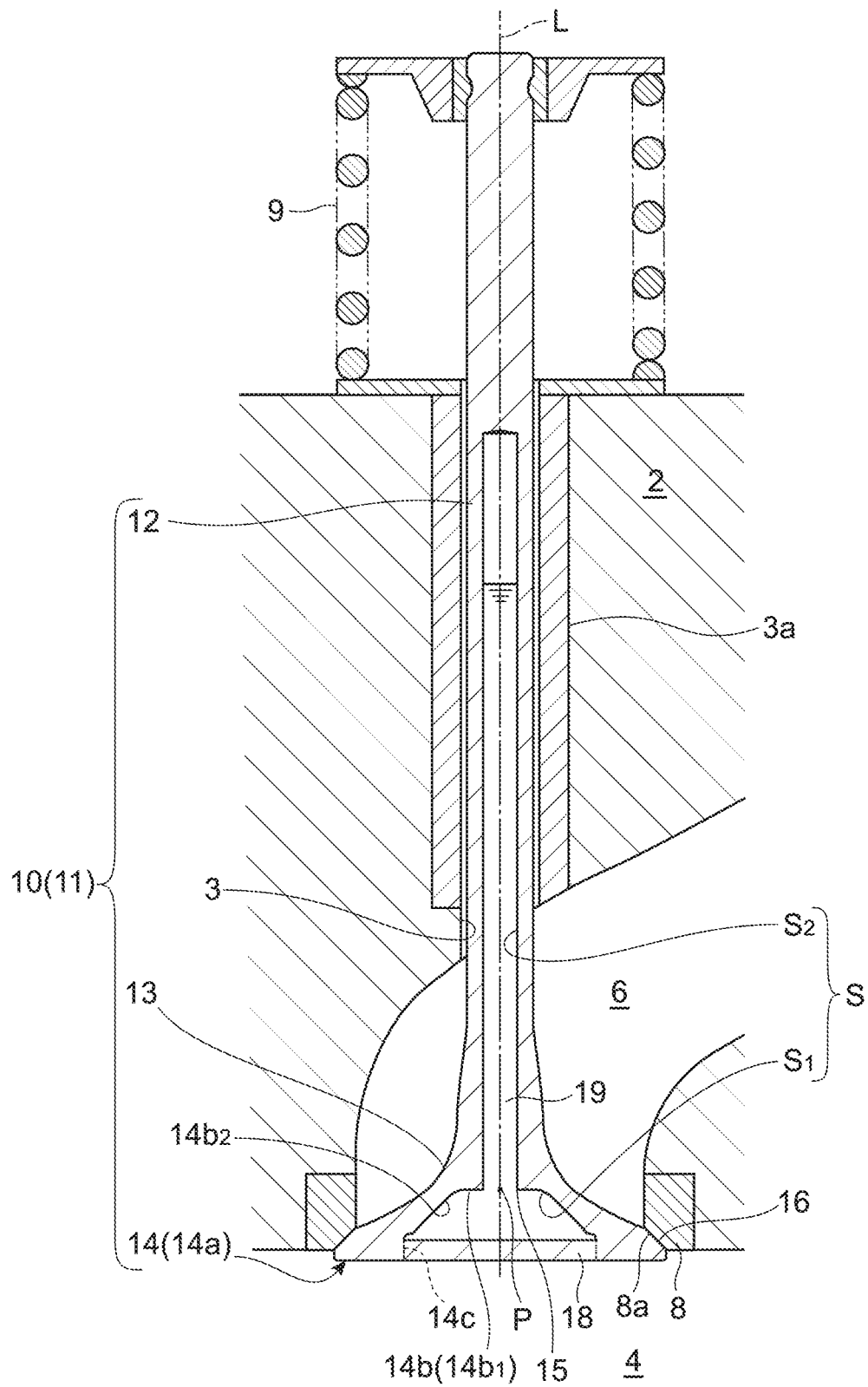
FIG. 1 is a longitudinal cross section of a hollow poppet valve manufactured by a first method according to the invention.
Figure 2:
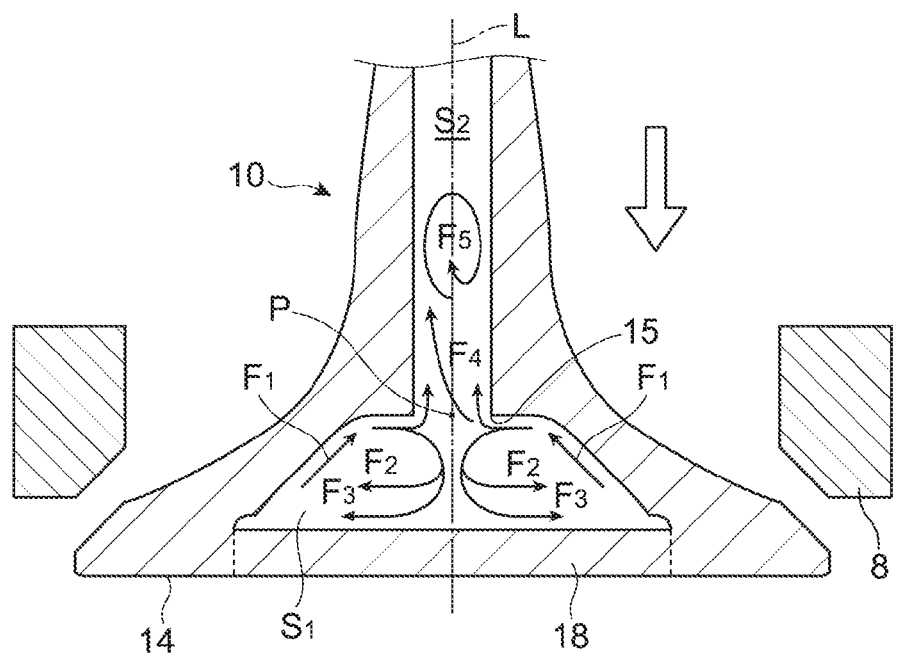
FIG. 2 shows in enlarged view movements of a coolant in the hollow poppet valve during reciprocal motions of the valve in its axial direction. More particularly.
Figure 2:
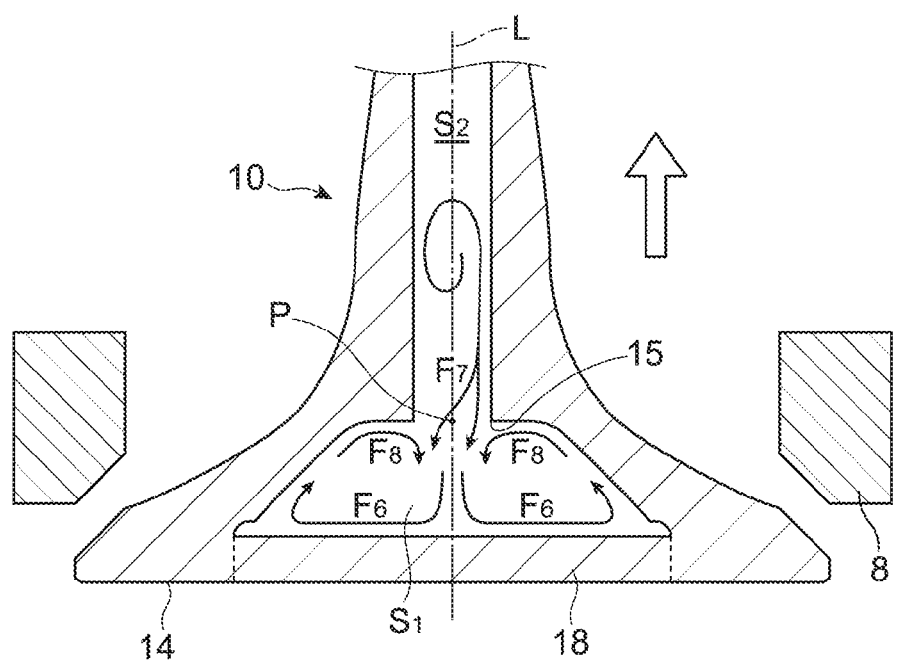

FIG. 1 shows a hollow poppet valve manufactured by a method of a first embodiment according to the invention. FIG. 2 shows in enlarged view movements of a coolant in the internal cavity of a hollow poppet valve during reciprocal motions in the axial direction of the valve.

As shown in FIG. 1, a hollow poppet valve 10, made of a heat resisting metal, has a valve head 14 which has a valve seat face 16 formed on its outer periphery and is integral at one end thereof with a linear stem portion 12 across a curved fillet portion 13 whose radius gradually increases.

Specifically, the hollow poppet valve 10 having an internal cavity S that extends from within the valve head 14 into the stem portion 12 is obtained from an intermediate valve product 11, which has a valve head shell 14a formed integrally at one end of a stem 12, by welding a cap onto an open end 14c of a circular cone shape recess 14b of the valve head shell 14a. The internal cavity S is filled with a coolant 19 such as a metallic sodium together with an inert gas such as argon. About 60-90% by volume of the internal cavity S is filled with the coolant 19.

FIG. 1 shows a cylinder head 2, an exhaust gas port 6 extending from a combustion chamber 4, and a tapered surface 8a of an annular valve seat insert 8 which is formed round the open end of the exhaust gas port 6 facing the combustion chamber 4 and adapted to receive, in abutting contact therewith, the valve seat face 16 of the valve head 10. FIG. 1 also shows a valve insertion hole 3 formed in the cylinder head 2, and a valve guide 3a on the inner wall of the valve insertion hole 3, for slidably supporting the stem portion 12 of the valve 10. A spring 9 is provided to urge the valve 10 to close the port 6.

The internal cavity S consists of a diametrically large truncated-cone shaped valve head cavity S1 formed in the valve head 14 (the cavity S1 hereinafter referred to as valve head cavity S1) and a diametrically small linear stem cavity S2 formed in the stem portion 12 perpendicularly to the valve head cavity S1 and in communication with the valve head cavity S1 (the cavity S2 hereinafter referred to as stem cavity S2). The ceiling of the valve head cavity S1 (that is, the bottom 14b1 of the truncated cone-shaped recess 14b) is a planar face perpendicular to the center axis L of the valve head 10 and communicated with an open end of the stem cavity S2.

An interconnecting region P interconnecting the valve head cavity S1 with the stem cavity S2 has an annular step 15 between them, which is eave-shaped when viewed from the valve head cavity S1. The planar face 14b1 of the annular step 15 faces the valve head cavity S1 and is perpendicular to the center axis L of the axis of the valve 10. In other words, the eave-shape step 15 is defined by a region of the planar bottom 14b1 of the recess 14b of the valve head shell 14a round the opening of the stem cavity S2 and by the inner periphery of the stem cavity S2.

Consequently, as the valve head 10 undergoes a reciprocal motion, the coolant 19 in the valve head cavity S1 manifests a vertical circular motion (vertical convection) as shown in FIG. 2(a) by arrows F1→F2→F3 and shown in FIG. 2(b) by arrows F6→F8, and at the same time turbulent flows of coolant 19 take place in the stem cavity S2 as shown by arrows F4, F5, and F7. Consequently, convection (circulatory flows) takes place in the entire internal cavity S along with turbulent flows of coolant 19 during reciprocal motions of the valve 10, thereby actively intermixing lower, middle and upper layers of the coolant 19 in the internal cavity S, and greatly improving the heat reduction capability of the valve.

A prior art application PCT/JP2012/075452 filed on Oct. 2, 2012 discloses in detail how upper, middle, and lower levels of the coolant 19 in the valve head cavity S1 is positively mixed by vertical circulations (convections) in the valve head cavity S1 and turbulent flows in the stem cavity S2 during reciprocal motions of the valve head 10.

Next, an inventive method of manufacturing a hollow poppet valve will be described in detail with reference to FIG. 3.

Referring to FIG. 3(a), there is shown a process of hot forging an intermediate valve 11 having a valve head shell 14a formed with the recess 14b and integral with the stem portion 12. The planar end Z14b1 of the truncated cone-shaped recess 14b of the valve head shell 14a is perpendicular to the stem portion 12 (that is, perpendicular to the center axis L of the intermediate valve product 11).

The hot forging may be either a sequence of extrusions performed by changing dies for extruding a heat resisting metal block into an intermediate valve 11 in steps, or an upset forging to form (a valve head shell 14a of) an intermediate valve product 11 using a die after upsetting a spherical portion at one end of a heat resisting alloy rod. Note that the curved fillet portion 13 is formed between the valve head shell 14a and the stem portion 12 of the intermediate valve product 11 during the hot forging, and so is the tapered valve seat face 16 formed on the outer periphery of the valve head shell 14a.

In the next hole drilling step, the intermediate valve product 11 is set with its recess 14b of the valve head shell 14a oriented upward, and a hole 14e (shown in FIG. 3 by a dotted line) is drilled to a depth of the stem cavity S2 into the bottom planar end 14b1 of the recess 14b of the valve head shell 14a.

In this hole drilling step, the recess 14b of the valve head shell 14a to form the valve head cavity S1 and the hole 14e of the stem portion 12 to form the stem cavity S2 are communicated with each other, and a region interconnecting the recess 14b and a hole 14e together form the eave-shape annular step 15 (as shown in FIG. 1) when the region is seen from the recess 14b.

On the other hand, in a first rod forming and storing step shown in FIG. 3(b), a linear clayish coolant material 19 (of metallic sodium) extruded from a nozzle 21 of a first extruder 20 is chopped to a coolant rod 19a of a predetermined length, which is stored in a first jig 30.

More particularly, a cutter 22 is provided near the nozzle 21 to cut the linear clayish coolant 19 extruded from the downward nozzle 21 of an extruder 20. The jig 30 is provided to receive the linear coolant material 19 depending downward by its weight from the nozzle 21 into the jig 30, and store the coolant rod 19a cut by the cutter 22.

The jig 30 has a transparent circular cylindrical jig body 32 made of an acrylic resin, a housing 31, and a cup shape guide portion 34 which has a circular central hole 34a, which are coaxially integrated together by the housing 31, as shown in FIG. 4(a). The jig body 32 is provided with a locking pin 33 for holding the coolant rod 19a in the jig body 32.

More particularly, the jig body 32 is provided with a pin insertion hole 32a that penetrates the jig body 32 in its transverse direction and with a locking pin 33 which can advance and retract along the pin insertion hole 32a. When the locking pin 33 protrudes into the jig body 32, it supports the lower end of the coolant rod 19a in the jig body 32. When the locking pin 33 is retracted out of the jig body 32, the coolant rod is 19a liberated from the locking pin 33 and can move downward by its weight, so that it can freely fall downward in the circular hole 34a of the guide portion 34.

It is noted that the first extruder 20 has an inner diameter (e.g. 2.5 mm) slightly smaller than that (e.g. 3.0 mm) of the stem cavity S2 of the valve head 10. Thus, the linear coolant material 19 extruded from the nozzle 21 and the cut coolant rod 19a have an outer diameters of 2.5 mm. The length of the coolant rod 19a is slightly shorter than the length of the stem cavity S2 of the stem portion 12, while the length of the jig body 32 itself is slightly longer than the length of the coolant rod 19a.

The inner diameter of the jig body 32 is made sufficiently larger (e.g. 3.5 mm) than the outer diameter (2.5 mm) of the coolant 19 so that the jig body 32 can smoothly receive therein the linear coolant material 19. The inner diameter of the circular hole 34a of the guide portion 34 is the same as the inner diameter (3.0 mm for example) of the stem cavity S2 of the valve head 10.

One lot of the coolant 19, or the length of the coolant material, extruded from the nozzle 21 is controlled by a piston for example installed in the extruder 20. Extrusion of the coolant 19 is stopped by stopping the piston, so that a predetermined amount of the coolant is extruded from the nozzle 21. When a cutter 22 is activated, a leading portion of the linear coolant material 19 is cut to a predetermined length. Thus, as the coolant 19 is extruded from the nozzle 21, its leading end is inserted into the jig body 32, with its linear configuration retained while it is cut in the transverse direction (perpendicularly to its length) by the cutter 22. Thus, the cut coolant rod 19a will not be deformed by the cutter and maintains a planar cut face perpendicular to the direction of extrusion.

The portion of the coolant 19 cut by the cutter 22 off the nozzle 21 is stored in the cylindrical jig body 32 of the jig 30 as a coolant rod 19a of a predetermined length and transferred to a station for a rod insertion step as shown in FIG. 3(c).

In the rod insertion step shown in FIG. 3(c), an intermediate valve 11 is supported from below with its valve head shell 14a oriented upward. The jig 30 which stores the coolant rod 19a is arranged so as to bring a recess 35 of the guide portion 34 into engagement with a valve head shell 14a of the intermediate valve 11. In other words, the jig 30 is arranged above the valve head shell 14a of the intermediate valve product 11 with its axis L1 aligned with the center axis L of the intermediate valve product 11. A gas feed nozzle 38 for feeding a high-pressure gas is disposed above an upper open end of the jig body 32 and held engaged with the nozzle 38.

Then, a highly pressurized argon gas is fed from the nozzle 38 into the jig body 32, and at the same time the locking pin 33 is retracted from the jig body 32 to allow the coolant rod 19a to instantly inserted from the jig body 32 into the stem cavity S2 of the intermediate valve product 11 through the circular hole 34a of the guide portion 34.

Figure 4:
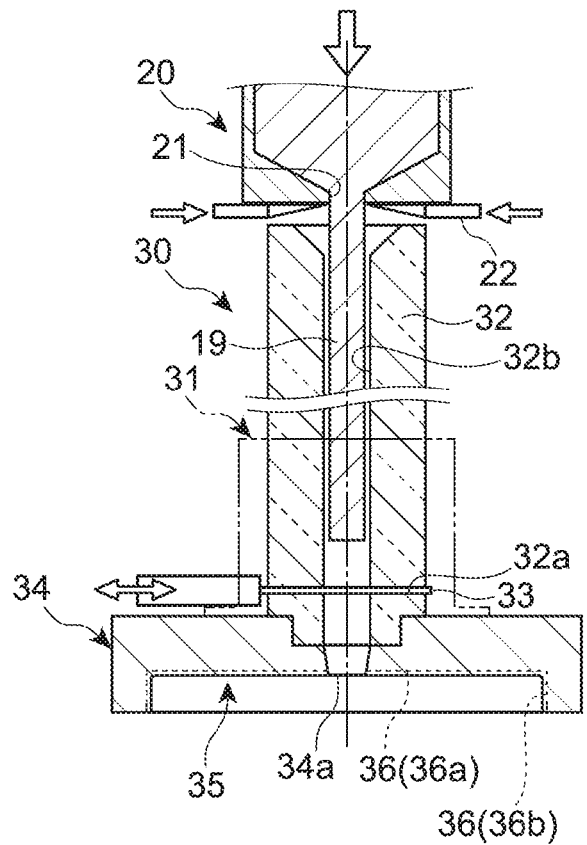
FIG. 4 shows longitudinal cross sections of jigs for storing different coolant rods. More particularly.
Figure 4:
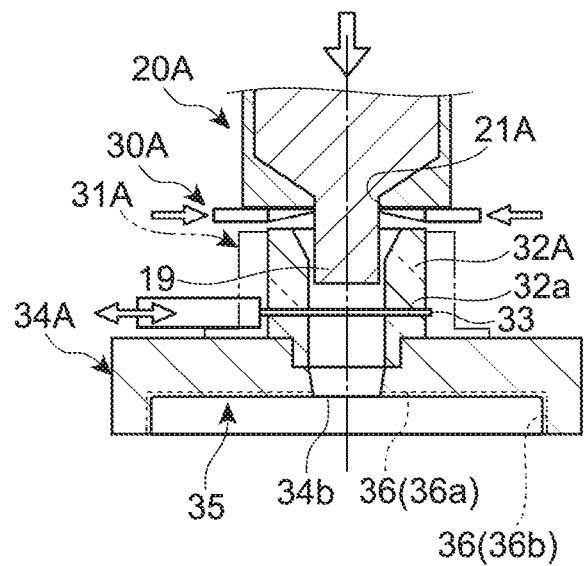
Figure 5:
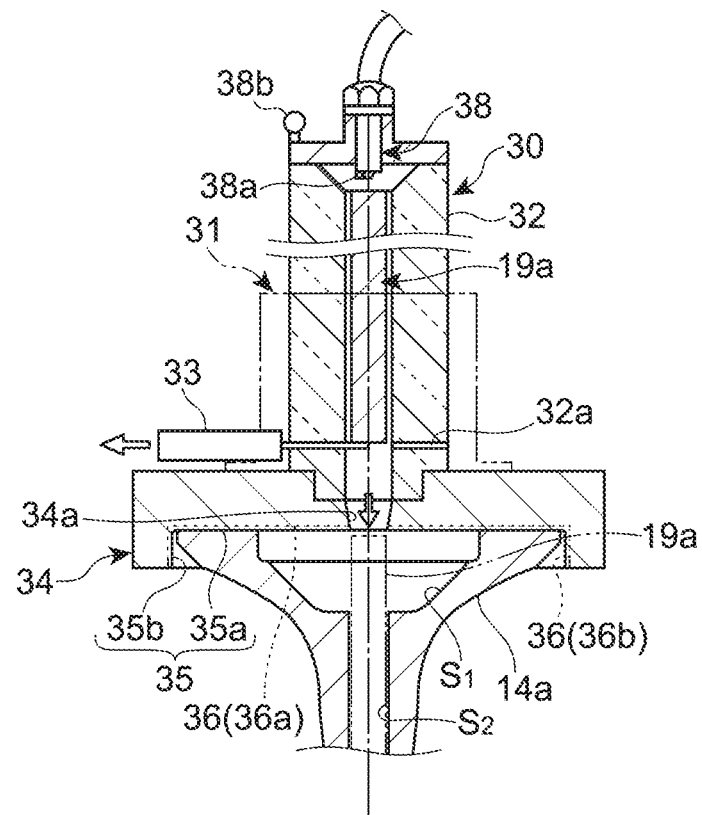
FIG. 5 is a longitudinal cross section of a lower guide portion of a jig.
Figure 6:
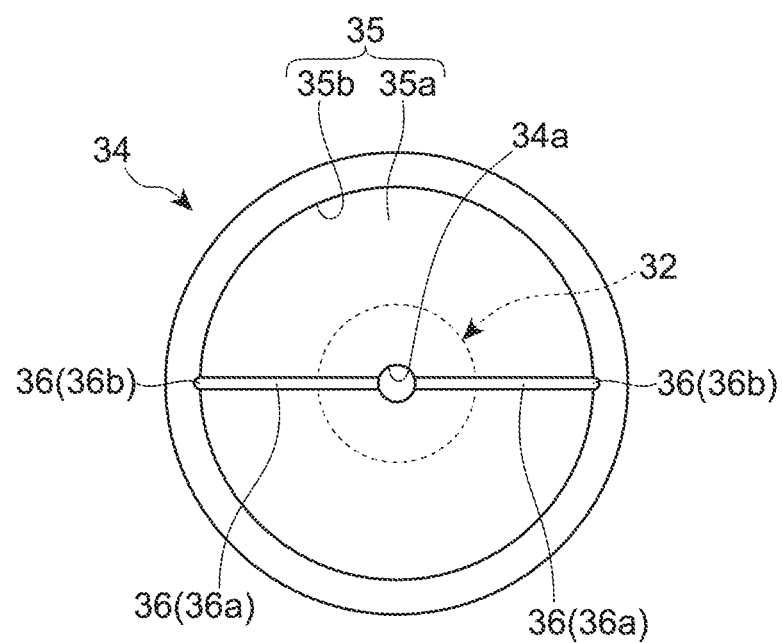
FIG. 6 is a bottom view of the lower guide portion.

It is would be noted that the recess 35 is formed below the guide portion 34 for engagement with the valve head 14 as shown in FIGS. 4(a), 5, and 6. The recess 35 has a circular ceiling 35a which has the circular hole 34a and a first inner periphery 35b which extends downward from the outer periphery of the circular ceiling 35a.

Grooves 36 (36a, and 36b) are formed to extend radially outwardly along the circular ceiling 35a, and then downwardly along the first inner periphery 35b. These grooves 36 (36a and 36b) function as a venting hole to discharge the gas from the internal cavity S when the coolant rod 19a is inserted from the jig body 32 into the stem cavity S2 of the intermediate valve product 11 below the jig.

A highly pressurized gas is fed to the jig body 32 from above while keeping the valve head shell 14a in engagement with the recess 35 of the guide portion 34 (that is, the open end of the valve head shell 14a tightly connected to the circular ceiling 35a). As the locking pin 33 is retracted, the coolant rod 19a in the jig body 32 is pushed into the stem cavity S2 of the intermediate valve product 11 under the pressure of the gas, and instantly inserted into the stem cavity S2 of the intermediate valve product 11, as the gas in the internal cavity S (or in the stem cavity S2) is discharged from the grooves 36 (36a and 36b) defined between the valve head shell 14a and the recess 35 of the guide portion 34.

In order to allow an operator of the extruder to visually confirm that the coolant rod 19a is ejected from three jig body 32 into the into the internal cavity S of the intermediate valve product 11, the nozzle 38 is provided with a gas pressure sensor 38a and a display 38b which is turned on if the gas pressure in the jig body 32 exceeds a predetermined level and turned off otherwise.

More in detail, when the tailing end of the coolant rod 19a passes through the circular hole 34a of the guide portion 34, the high pressure gas is vented from the jig body 32 via the grooves 36 serving as a venting hole as shown in FIG. 5 by a double dotted line, thereby reducing the pressure in the jig body 32. However, since the pressure will not be reduced and the display 38b will remain turned on if the coolant rod 19a partially remains in the guide portion 34. The operator can then recognize that ejection of the coolant rod 19a from the guide portion 34 of the jig 30 is incomplete.

In the step shown in FIG. 3(c), when the insertion of the coolant rod 19a into the stem cavity S2 is completed, the jig 30 (that is, the jig body 32) returns to its home position below the nozzle 21 of the first extruder 20, and the space above the valve head shell 14a of the intermediate valve product 11 is opened in preparation for the next coolant rod pressurizing step shown in FIG. 3(d).

In the step shown in FIG. 3(d), the coolant rod 19a in the stem cavity S2 is pressurized by a pushing rod 40a from above so as to be plastically deformed until the coolant rod 19a is brought into intimate contact with the inner periphery of the stem cavity S2. The pushing rod 40a is pressurized to eliminate gaps between the coolant 19 and the inner periphery of the stem cavity S2.

As a result of pushing the pushing rod 40a, the coolant rod 19a is inserted deeply and securely into the stem cavity S2 if the coolant rod 19a is caught in the middle of the stem cavity S2 in the preceding coolant insertion step.

From a magnitude of downward travel of the pushing rod 40a, it is possible to detect whether or not the coolant rod 19a is correctly inserted in the stem cavity S2 as intended, and whether the coolant rod 19a has a proper length. If a proper length of coolant rod 19a is inserted, the downward distance traveled by the pushing rod 40a is constant. On the other hand, if a coolant rod 19a is too short or too long, the travel distance of the coolant rod 19a into the stem cavity S2 will fall outside a predetermined range.

In this way, in pressuring step as shown in FIG. 3(d), a proper length of the coolant rod 19a inserted in the stem cavity S2 can be detected from the downward travel distance of the pushing rod 40a into the coolant rod.

On the other hand, while the first coolant rod pressuring step shown in FIG. 3(d) is conducted, a second rod-forming and storing step is conducted as shown in FIG. 3(e), in which a second coolant rod 19b of a predetermined length is cut off a linear coolant material extruded from a nozzle 21A of a second extruder 20A using a cutter 22A, and is stored in a downward second jig 30A.

Figure 3:
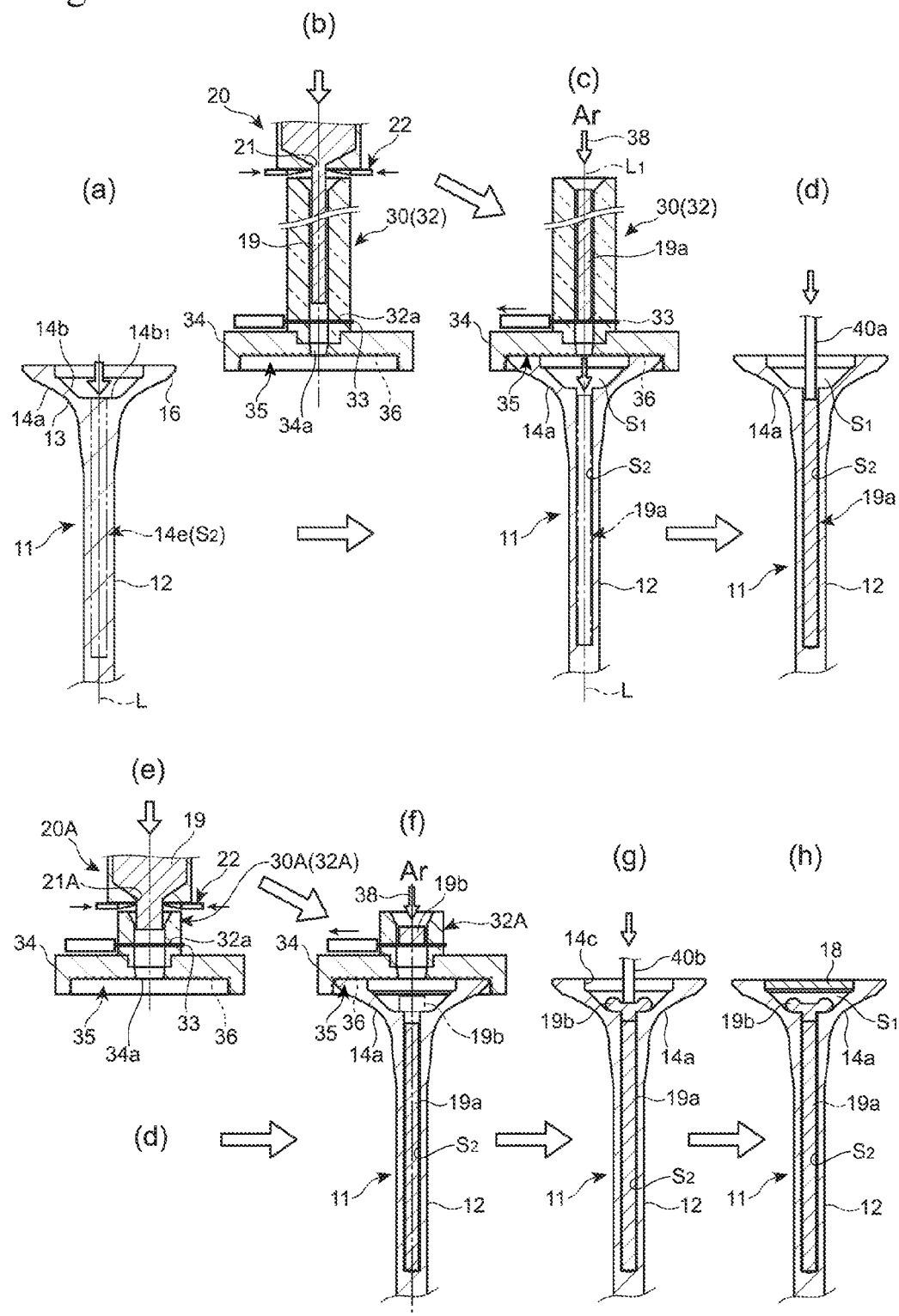
FIG. 3 shows steps of manufacturing a hollow poppet valve according to the present invention. More particularly.

FIG. 3(*e*) shows a second rod-forming and storing step that corresponds to a first rod-storing step shown in FIG. 3(*b*). In this second rod-forming and storing step, a second extruder 20A has a nozzle 21A whose inner diameter is sufficiently larger than the hole diameter (3.0 mm for example) of the stem cavity S2 but sufficiently smaller than the diameter of the valve head cavity S1 so as to form a coolant rod 19*b* having an adequate diameter for insertion into the valve head cavity S1. It is noted that, like the first extruder 20, the second extruder 20A is also adapted to exclude a predetermined amount of coolant from its nozzle 21A, so that a further description will be omitted.

The length of a body of a transparent acrylic cylinder of the jig body 32A, constituting the second jig 30A, has a predetermined length appropriate for storing a proper volume of the coolant rod 19*b* in the valve head cavity S1.

In other words, the second jig 30A has the same basic structure as the first jig 30A for use in the step shown in FIG. 3(*b*)-(*c*). However, the 32A is configured to have an inner diameter and an axial length adequate for smoothly receiving a linear coolant 19 extruded out of the 21A and for storing cut coolant rod 19*b*.

In the 34A integrated with, and communicated with, the 32A (FIG. 4(*b*)), a circular hole 34*b* is also formed to have an appropriate dimension so as to allow the coolant rod 19*b* to pass through it. The guide portion 34A is formed in the lower end thereof with a recess 35 for engagement with the valve head shell 14*a*. The recess 35 has grooves 36 (36*a*, 35*b*) which function as a venting hole.

Other features of the jig 30A are the same as those of the jig 30 shown in FIG. 4(*a*) and FIG. 5, so that further description of the jig 30A will be omitted by referring like or the same elements in both figures to the same reference numbers.

It is noted that as the predetermined amount (or length) of linear coolant 19 is excluded from the nozzle 21A of the extruder 20A, extrusion of the coolant 19 from the nozzle 21 is stopped, and then the cutter 22 is activated to cut the coolant 19 to a straight rod of a predetermined length in a process shown in FIG. 3(*e*).

As the coolant 19 is extruded from the nozzle 21A, its leading end is inserted into the jig body 32A while keeping its straight configuration, and is cut to a piece by the cutter 22 with its opposite cut ends not deformed by the cutter 22, so that each cut coolant rod 19*b* maintains a flat cut face perpendicular to its longitudinal direction.

The coolant 19 cut off the nozzle 21A into a coolant rod coolant rod 19*b* of a predetermined length is stored in the downward jig 30A (or the cylindrical jig body 32A) until it is transferred to a station for the second coolant-rod insertion step shown in FIG. 3(*f*).

The step shown in FIG. 3(*f*) is provided for insertion of the coolant rod 19*b* into the valve head cavity S1, where the intermediate valve product 11, now charged with the densely packed coolant 19 deeply in the stem cavity S2 of the intermediate valve product 11, is supported with its valve head shell 14*a* oriented upward.

More particularly, upon completion of pressurization of the coolant rod 19*a* with the pushing rod 40*a* in the first coolant pressurizing step shown in FIG. 3(*d*), the pushing rod 40*a* is withdrawn back to its home position so that the space above the valve head shell 14*a* of the intermediate valve product 11 is opened. In a step as shown in FIG. 3(*e*), the jig body 32A of the jig 30A storing the coolant rod 19*b* is arranged above the valve head shell 14*a* of the intermediate valve product 11 such that the recess 35 of the guide portion 34 comes into engagement with the valve head shell 14*a* as shown in FIG. 3(*f*).

Specifically, in the second coolant-rod insertion step, the jig 30A that stores the coolant rod 19*b* is accurately aligned with the upper open end of the valve head shell 14*a* of the intermediate valve product 11 coaxially with the intermediate valve product 11, and the upper open end of the jig body 32A is engaged with the nozzle 38 (FIG. 5).

As the high-pressure argon gas is fed from the nozzle 38 into the jig body 32A and the locking pin 33 is retracted from the jig body 32A, the coolant rod 19*b* are instantly inserted from the jig body 32A into the downward valve head cavity S1 of the intermediate valve product 11 through the circular hole 34*b* of the guide portion 34.

In the step shown in FIG. 3(*f*), upon completion of insertion of the coolant rod 19*b* into the valve head cavity S1, the jig 30 is transferred back to its home position below the nozzle 21A of the extruder 20A, thereby opening an upper side of the valve head shell 14*a* of the intermediate valve product 11. The inventive method then proceeds to the next step shown in FIG. 3(*g*).

In the step shown in FIG. 3(*g*), the coolant rod 19*a* in the stem cavity S2 of the intermediate valve product 11 is pushed from above with a pushing rod 40*b* to pressurizing them partly into the stem cavity S2, until the coolant rod 19*b* is plastically deformed in tight contact with the inner peripheries of the valve head cavity S1 and the stem cavity S2.

In the coolant pressurizing step shown in FIG. 3(*g*), it is also possible on the basis of the travel distance of the pushing rod 40*b* to detect whether or not the coolant rod 19*b* is properly inserted in the valve head cavity S1 and the length of the coolant rod 19*b* is appropriate.

In the last step shown in FIG. 3(*h*), the cap 18 is welded (by means of resistance welding for example) onto the opening 14*c* of the recess 14*b* of the valve head shell 14*a* in an argon atmosphere to seal the internal cavity S of the intermediate valve product 11. The cap 18 may be alternatively welded by means of resistance welding.

In order to avoid oxidization of the easily oxydizable metallic sodium for use as the coolant 19 as much as possible, it is preferred to conduct the last step shown in FIG. 3(*h*) in an atmosphere of inert gas such as argon.

Figure 7:
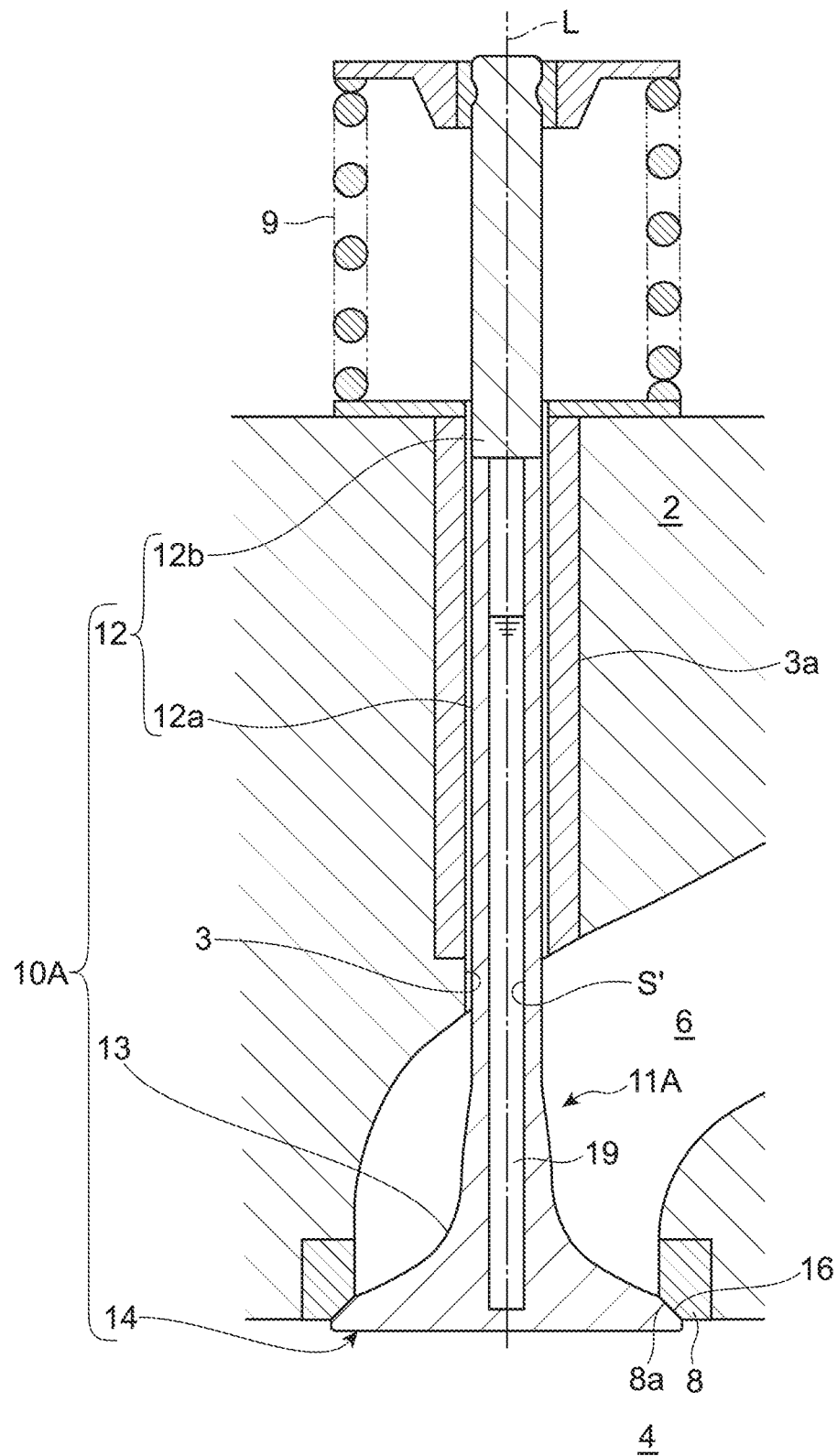
FIG. 7 is a longitudinal cross section of a hollow poppet valve manufactured by a second method according to the invention.
Figure 8:
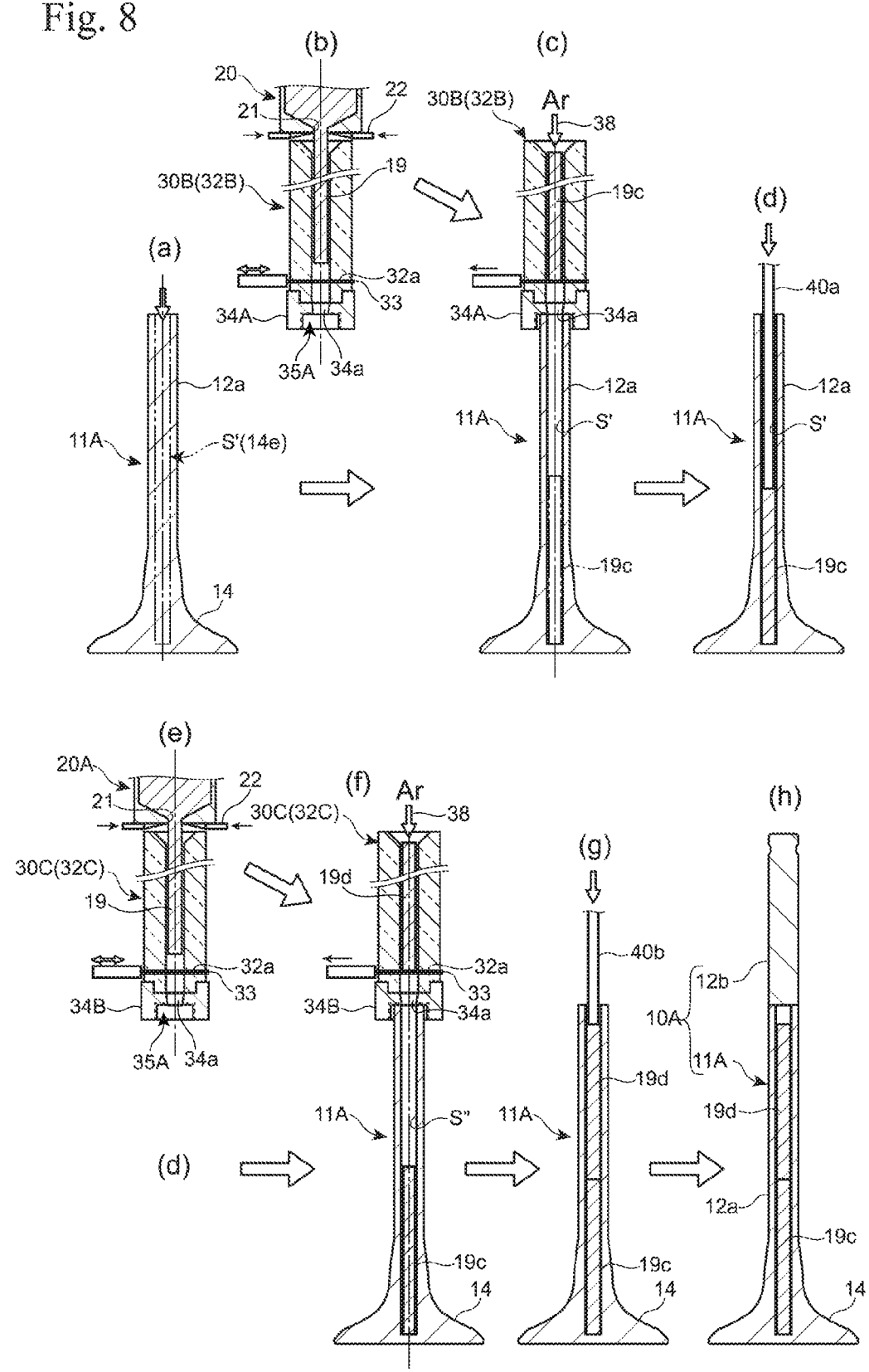
FIG. 8 shows steps of manufacturing the hollow poppet valve shown in FIG. 7. More particularly.

FIGS. 7 and 8 show a hollow poppet valve manufactured by the second method.

It is seen in FIG. 7 that in contrast to the valve head cavity S1 of the valve head 10 manufactured by the first method, an internal cavity S' of a hollow poppet valve 10A manufactured by the second method has a constant inner diameter in the valve head 14 and the stem portion 12.

It is also seen that a mechanically strong stem member stem member 12*b* is connected at one end of a stem portion 12*a* of an intermediate valve product 11A that has a hole that corresponds to the internal cavity S'.

Other features of this structure similar to those of the foregoing example will not be repeated, by simply denoting like or the same elements by the same reference symbols.

Next, a method of manufacturing a hollow poppet valve 10A will now be described in detail with reference to FIG. 8.

First, an intermediate valve product 11A is hot forged or upsetting forged to have a valve head 14 integral with a stem portion 12*a*, as shown in FIG. 8(*a*).

Next, a hole 14*e* (shown in FIG. 8(*a*) by a dashed line) is bored to form an internal cavity S' that extends from one end of the stem portion 12*a* to the valve head 14, by drilling one end of the stem portion 12a as shown in FIG. 8(a) until the hole 14e has the same depth as the S'.

On the other hand, in the step shown in FIG. 8(b), the clayish coolant 19 extruded from the nozzle 21 of the first extruder 20 is cut to a predetermined length and a cut coolant rod 19c is stored in a first rod-forming and storing step (the coolant rod 19c is stored in a first cylindrical jig body 32B of the first jig 30B.

When compared with the jig 30 (FIGS. 4 and 5), the jig 30B has basically the same features as the jig 30, except that the jig 30B has the jig body 32B which is shorter in its axial length than the jig body 32 as compared with the jig 30, a recess 35A of the guide portion 34A is enlarged to engage with the stem end of the intermediate valve product 11A, so that further description of the jig 30B will not be repeated by simply referring the same or like elements by the same reference symbols.

In a step shown in FIG. 8(b), a coolant 19 extruded from the nozzle 21 and cut by the cutter 22 into a coolant rod 19c, is stored in the jig 30B below the nozzle 21 before it is transferred to a station for a rod insertion step.

In a step shown in FIG. 8(c), the intermediate valve product 11A is arrange with its open end of the internal cavity S' of the intermediate valve product 11A upward the jig 30B is arranged so that the recess 35A of the guide portion 34A is engagement with the stem portion of the intermediate valve product 11A. The nozzle 38 is disposed above the open end of the jig body 32 and in engagement with the open end.

As a high pressure argon gas is fed from the nozzle 38 into the jig body 32B, The coolant rod 19c in the jig body 32B is instantly inserted into the internal cavity S' of the intermediate valve product 11A through the valve guide 3a.

In the step shown in FIG. 8(c), upon completion of insertion of the coolant rod 19c in the internal cavity S', the jig 30B (and the jig body 32B) is transferred back to its home position below the nozzle 21 of the first extruder 20, so that the space above the stem portion of the intermediate valve product 11A is opened in preparation for the next coolant-rod pressuring step shown in FIG. 8(d).

In the step shown in FIG. 8(d), the coolant rod 19c in the internal cavity S' of the intermediate valve product 11A are pushed by the pushing rod 40a from above to plastically deform them and bring the coolant rod 19c in tight contact with the inner periphery of the internal cavity S'.

During the first coolant pressuring step shown in FIG. 8(d), a second coolant-rod forming and storing step is conducted, in which the linear coolant extruded from the nozzle 21 of the second 20A is cut with the cutter 22 to form a coolant-rod 19d of a predetermined length, which is stored in a second jig 30C below the cutter 22.

The second jig 30C has the same structure as the first jig 30B shown in FIGS. 8(b)-(c), so that no further description will be given by simply referring it by the same reference symbol.

In the step shown in FIG. 8(e), a coolant rod 19d obtained by cutting the coolant 19 off the nozzle 21A is stored in the jig 30C (or in a cylindrical jig body jig body 32C) below the cutter before it is transferred to a station for the second coolant-rod insertion step shown in FIG. 3(f).

In the step of inserting a coolant rod 19d into the internal cavity S' as shown in FIG. 8(f), the intermediate valve product 11A is supported with one end adjacent the stem portion oriented upward, and is charged with densely packed coolant 19 deeply in the internal cavity S' of the 11A.

More particularly, upon completion of pressurizing the coolant rod 19c with the pushing rod 40a in the first coolant pressurizing step shown in FIG. 8(d), the pushing rod 40a is withdrawn back to its home position so that the space above the upper end of the stem portion of the intermediate valve product 11A is opened. In a step as shown in FIG. 8(e), the jig body 32C of the jig 30C storing the coolant rod 19d is arranged above the valve head shell 14a of the intermediate valve product 11A so as to bring the recess 35A of the guide portion 34A into engagement with the stem end of the intermediate valve product 11A as shown in FIG. 8(f).

As high-pressure argon gas is fed from the nozzle 38 into the jig body 32C and the locking pin 33 is retracted, the coolant rod 19d extracted downward from the jig body 32C are instantly inserted from the internal cavity S' of the intermediate valve product 11.

Next, in the step shown in FIG. 8(g), the coolant rod 19d in the internal cavity S' of the intermediate valve product 11A is pushed from above with a pushing rod pushing rod 40b until the coolant is plastically deformed in tight contact with the inner periphery of the internal cavity S'.

In the last step shown in FIG. 8(h), the internal cavity S' of the hollow poppet valve 10A is sealed by welding a stem member 12b onto an open end of the stem portion under an argon atmosphere.

In order to avoid oxidization of the easily oxydizable metallic sodium for use as the coolant 19 as much as possible, it is preferred to conduct the last step shown in FIG. 3(h) in an atmosphere of inert gas such as argon.

Figure 9:
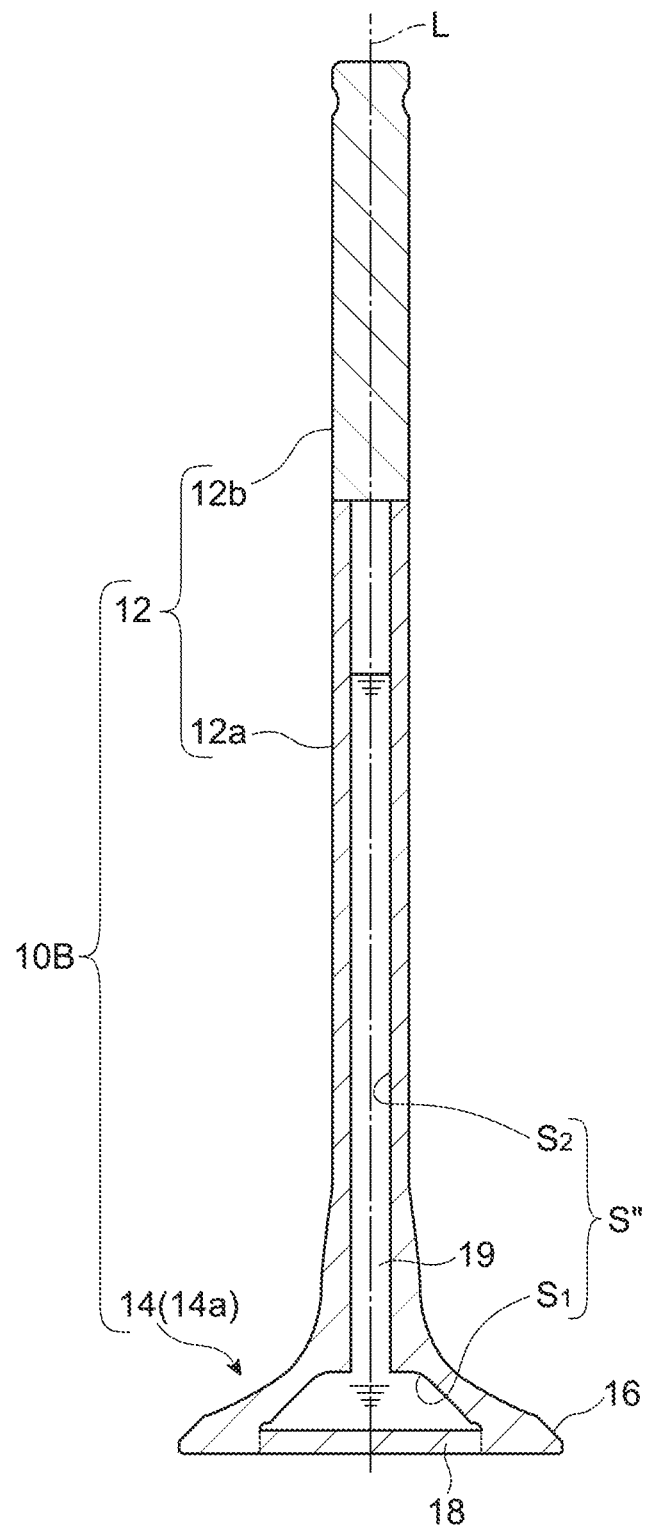
FIG. 9 shows a longitudinal cross section of a hollow poppet valve manufactured by a third method according to the invention.
Figure 10:
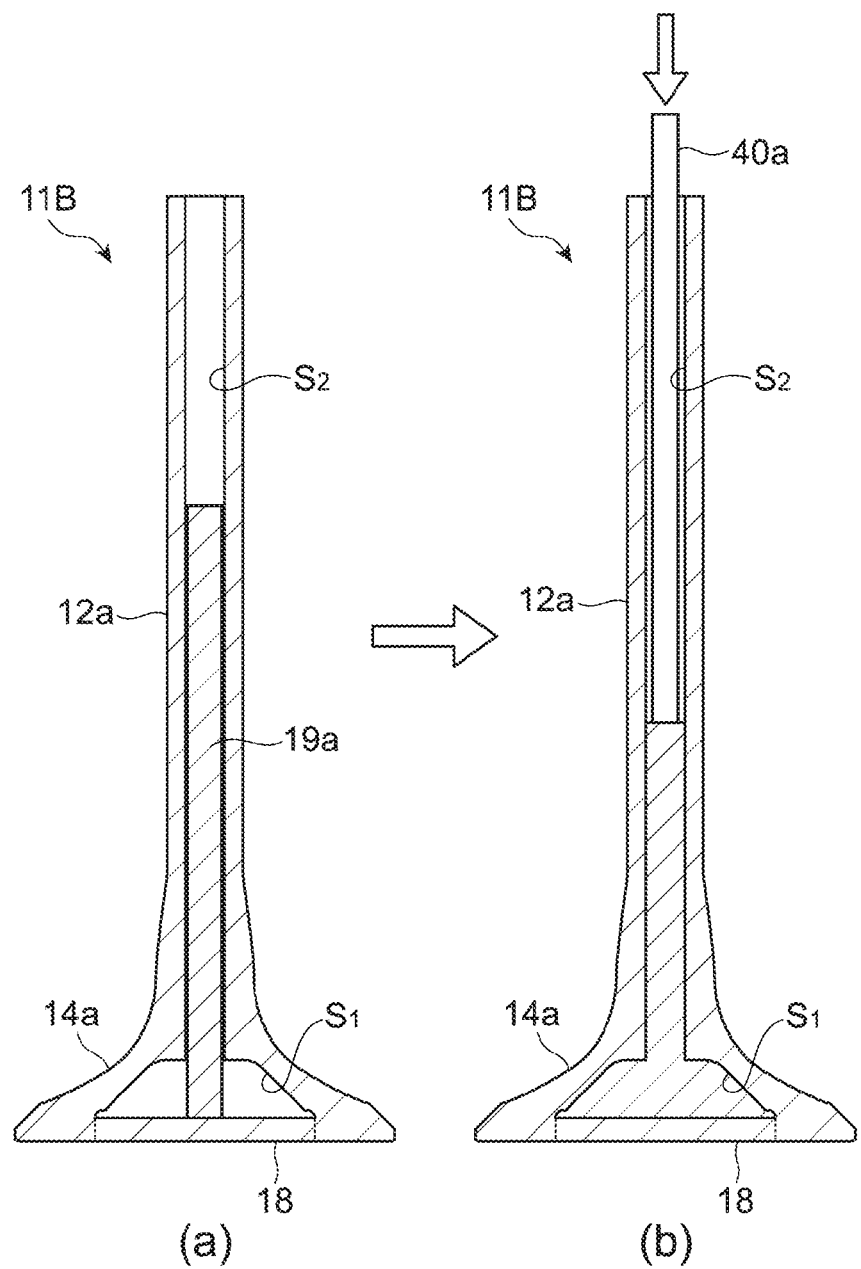
FIG. 10 shows major processes of the third method. More particularly.

In the case of a second hollow poppet valve 10A shown in FIGS. 7 and 8, its internal cavity S' has a constant inner diameter across the valve head and the stem portion, and although the S' formed in the valve head 14 and the stem portion 12a of the intermediate valve product 11A and has an opening at one end of the stem portion, the stem member 12b is integrally welded onto the stem member 12b to seal the hole that corresponds to the S' filled with the coolant 19. This method provides, embodied in a third embodiment shown in FIGS. 9 and 10, provides a hollow poppet valve 10B in which an internal cavity S" consists of the valve head cavity S1 of the valve head 14 and the stem cavity S2 of the stem portion 12 in communication with the valve head cavity S1, wherein the stem member 12b is integrally welded to an open end of a stem portion of an intermediate valve product 11B. This method can be applied to a method of manufacturing a valve in which a hole (that corresponds to the coolant filled S") is enclosed in this manner.

The method of manufacturing a hollow poppet valve 10B, embodied in the third embodiment, is the same as the method shown in FIG. 8 for manufacturing a poppet valve hollow poppet valve 10A. FIGS. 10(a)-(b) correspond to FIGS. 8(c)-(d). More particularly, FIG. 10(a) shows a cross section of an intermediate valve product charged with a first coolant rod 19a in the stem cavity S2 in the first coolant-rod insertion step, and FIG. 10(b) a cross section of the intermediate valve product with its first coolant rod 19a inserted in the stem cavity S2 is pressurized with a pushing rod 40a.

In the first step shown in FIG. 10(b), the first coolant rod 19a in the stem cavity S2 is pressed by the pushing rod 40a so that the coolant is tightly charged in the valve head cavity S1.

Other processes involved in the step are the same as in the step of manufacturing the hollow poppet valve 10A shown in FIG. 8, and a further description of the processes will not repeated.

It would be understood that, although the coolant rods are separately inserted into the hole of the intermediate valve product in two steps in any of the first, second, and the third methods, the coolant may be further divided and inserted separately in three or more than three steps.

Three methods of manufacturing hollow poppet valves 10, hollow poppet valve 10A, and 10B have been described in detail above for cases where metallic sodium is charged as a coolant 19 together with an inert gas in the respective internal cavities S, S', and S". However, it should be understood that a coolant 19 to be charged in these internal cavities can be, in place of metallic sodium, zinc-aluminum (ZnAl) alloy which is a hardly oxydizable.

Since zinc aluminum alloy cannot be easily oxidized, it needs no inert gas to be charged together in the internal cavity of the valve, and instead the alloy can be charged with air in the internal cavity. Consequently, no facility is needed to store the coolant, and a facility for charging the coolant is simple in structure, rendering manufacturing cost greatly reduced.

BRIEF DESCRIPTION OF SYMBOLS 10, 10A, 10C hollow poppet valve
11, 11A, 11B intermediate valve product
12 stem portion
14 valve head
14a valve head shell
12b stem member
14a valve head shell
14b recess formed at the front end of valve head shell
14b1 circular ceiling of valve head cavity (diametrically large internal cavity)
14b2 internal periphery of truncated cone-shape recess formed in valve head shell
L center axis of valve
S, S', S" internal cavities
S1 truncated cone-shape valve head cavity (diametrically large internal cavity)
S2 stem cavity (diametrically small linear internal cavity)
P interconnecting region
18 cap
19 coolant
19a, 19b, 19c, 19d coolant rods
40a, 40b pushing rods
30, 30A, 30B, 30C jigs
32, 32A, 32B, 32C cylindrical jig body
34, 34A guide portions
35, 35A recesses
36 (36A, 36B) grooves functioning as venting hole
38 high-pressure gas feed nozzle

The invention claimed is:

1. A method of manufacturing a hollow poppet valve having an internal cavity that extends from within a valve head into a stem portion of the hollow poppet valve and is filled with a coolant, the method comprising:
a coolant-rod forming step including extruding a linear clayish coolant from a nozzle of an extruder and cutting the linear coolant into coolant rods of a predetermined length;
a plurality of coolant-rod inserting steps each including inserting the coolant rod into a hole of an intermediate valve product that corresponds to the internal cavity of the hollow poppet valve, through an open end of the hole, such that more than one coolant rod is inserted into the hole of the intermediate valve product;
a coolant-rod pressurizing step including pressurizing each of the coolant rods in the hole with a pressing rod, thereby plastically deforming the coolant rods, following insertion of each coolant rod; and
a sealing step for sealing the open end of the hole.

2. The method according to claim 1,
wherein, in the plurality of coolant-rod insertion steps, the coolant rods are inserted into the hole of the intermediate valve product via an opening of a valve head cavity formed in a bottom of the valve head of the intermediate valve product, the valve head cavity communicating with a stem cavity, the stem cavity being diametrically smaller than the valve head cavity; and
wherein, in the sealing step, a cap is welded to the opening of the valve head cavity.

3. The method according to claim 2, wherein the plurality of coolant-rod insertion steps includes a first coolant-rod insertion inserting a coolant rod having a diametrically small thickness that corresponds to the stem cavity and a second coolant-rod insertion inserting a coolant rod having a diametrically large thickness that corresponds to the valve head cavity.

4. The method according to claim 1, wherein the coolant-rod pressurizing step includes determining existence of the coolant rods in the hole and propriety in length of the coolant rods on the basis of a length of the pressing rod inserted into the hole.

5. The method according to claim 1, wherein the coolant-rod forming step includes
causing the linear coolant extruded from the nozzle of the extruder to be inserted into a circular cylindrical jig disposed in opposition to a lower open end of the nozzle;
stopping extrusion of the linear coolant from the nozzle when a predetermined amount of coolant rod is extruded from the nozzle; and
cutting the linear coolant to the coolant rod of a predetermined length with a cutter provided in the neighborhood of the nozzle, and storing the cut coolant rod in the jig,
wherein the coolant rod in the jig is arranged above, and in opposition to, an upper open end of the hole of the intermediate valve product and is ejected into the hole of the intermediate valve product by a pressure of a gas acting on a rear end of the coolant rod, by bringing a downward opening of a cup shape guide portion provided on a lower end of the jig into engagement with an upper end of the intermediate valve product, and
wherein the pressurized gas in the hole of the intermediate valve product is discharged from the hole through a groove formed in an inner surface of a recess of the cup shape guide portion in contact with an upper end of the intermediate valve product.

6. The method according to claim 1,
wherein each of the plurality of coolant-rod insertion steps includes inserting a coolant rod into the hole of the intermediate valve product via an opening of a stem cavity formed at one end of a stem of the intermediate valve product, the stem cavity communicating with the valve head cavity, the stem cavity being diametrically smaller than the valve head cavity; and
wherein the sealing step includes joining a stem end member to an open end of the stem of the intermediate valve product.

* * * * *